March 20, 1951     S. L. GOLDSBOROUGH     2,545,995

POLARIZED PROTECTIVE RELAY

Filed Dec. 30, 1947

INVENTOR
Shirley L. Goldsborough.
BY O. B. Buchanan
ATTORNEY

Patented Mar. 20, 1951

2,545,995

UNITED STATES PATENT OFFICE 2,545,995

POLARIZED PROTECTIVE RELAY

Shirley L. Goldsborough, Basking Ridge, N. J., assignor to Westinghouse Electric Corporation, East Pittsburgh, Pa., a corporation of Pennsylvania Application December 30, 1947, Serial No. 794,659

19 Claims. (Cl. 175—294)

My invention relates to unidirectional-current forms of protective relays for alternating-current transmission-lines. More particularly, my invention relates to a unidirectional-current differential relay in which the operating and restraining forces are respectively responsive to the quantities which are obtained by rectifying resultant single-phase vectors of the type (Ė+İ and (Ė—İ).

It is already known that modified-impedance relay-characteristics can be obtained by energizing a relay-means in response to two diverse line-derived single-phase relaying quantities, either one or both of which are the resultant of any magnitude and phase-angle of line-voltage and line-current responses, combined vectorially into a single resultant single-phase relaying quantity. My Patent 2,404,955, granted July 30, 1946, has shown that these two resultant quantities can be applied respectively to the operative and restraining sides of a differential relay, and my Patent 2,380,164, granted July 10, 1945, has shown that the same results can be obtained by applying the two resultant single-phase relaying quantities to a product-type relay. An important characteristic of these relays is that they readily lend themselves to a triple-adjustment feature, for adjusting the radius and the circle-center displacement of the response-characteristic which is obtained by plotting the locus of the balance-point impedance of the relay, at all possible line-current phase-angles, in terms of the line-resistance $$R = \frac{E}{I} \cos \theta$$

and the line-reactance $$X = \frac{E}{I} \sin \theta$$

This triple-adjustment feature is more particularly described and claimed in my Patent 2,393,983, granted February 5, 1946, for a differential-type relay, and in my Patent 2,426,013, granted August 19, 1947, for a product-type relay. Variations using current-energized compensators are described in Sonneman's Patents 2,425,759 and 2,426,062, granted August 19, 1947, showing differential-type relays, and Lenehan's Patent 2,426,033, granted August 19, 1947, showing a product-type relay.

An object of my invention is to accomplish the same purposes as those described in the patents just mentioned, with a relay-means which is responsive to the quantities which are obtained by rectifying each of the two single-phase relaying-quantities which have heretofore been utilized in the energization of a modified-impedance relay. By this means, I am enabled to utilize a differentially responsive polarized relay, which is known to derive a large proportion of its operating energy from its polarizing flux, thus producing a larger operative force from a given electrical input, making the relay more effective than either a differential or product-responsive type of alternating-current relay. According to this phase of my invention, the invention is applicable to all types and adjustments of modified-impedance relays.

A further object of my invention is to provide a single relaying element which is responsive to a composite of a plurality of diverse single-phase responses to conditions on a polyphase line, so that a single element will protect the line, regardless of which phase or phases are affected by a fault. To accomplish this purpose of my invention, it is only necessary to superimpose the differential unidirectional responses in the different phases, all on a single polarized relay. By this means, I avoid the necessity for providing a separate modified-impedance relay for each phase, and it may be connected so as to be responsive to both phase and ground faults as will be subsequently described.

A further, and more particular, object of my invention is to provide a directionally responsive protective relay, for an alternating-current line, using a differentially responsive unidirectional-current relaying element. A directional element may be regarded as a particular case of a modified-impedance element, in which the circle-radius is infinite or very large, resulting in a substantially rectilinear response-characteristic of the relay, preferably a rectilinear response-characteristic which passes through, or near, the origin of the coordinates representing the line-resistance R and the line-reactance X.

A still more specific object of my invention is to provide a three-phase directional element, or a plurality of single-phase directional responses, combined in a single differentially responsive unidirectional-current relay. Heretofore, the more successful types of three-phase directional elements have involved a plurality of separate torque-producing elements mounted on a common shaft, and taking up much more room, and requiring a greater electrical input-energy, for a given effective operating-force, than my improved differential unidirectional-current relay, particularly when a polarized relay is used in carrying out my invention.

With the foregoing and other objects in view, my invention consists in the circuits, systems, apparatus, combinations, parts, and methods of operation and assembly, hereinafter described and claimed, and illustrated in the accompanying drawing, wherein:

Figure 1:
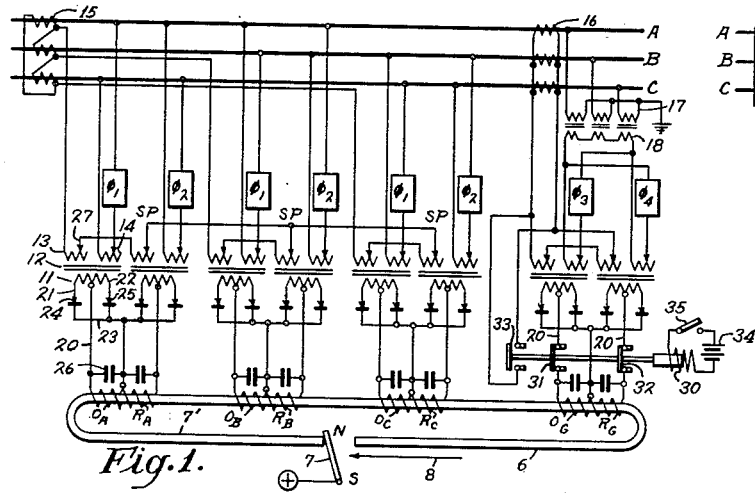
Figure 1 is a diagrammatic view of circuits and apparatus, illustrating my invention as being applied generally to any composite multi-phase response of a modified-impedance type, having adjustable modified-impedance characteristics.

As set forth in my Patent 2,404,955, two diverse line-derived single-phase relaying quantities are used for energizing my relay, or for energizing each of the single-phase response-producing means for my relay, if the relay is compositely responsive to a plurality of such single-phase responses, in different phases of a polyphase line. These two line-derived single-phase relaying quantities may be expressed in various ways, such as $(gI\angle\theta + hE\angle S)$ and $$[mI\angle(\theta+T) - nE\angle(T+U)]$$

where $\theta$ is the power-factor angle of the line-current, and $S$, $T$ and $U$ are any arbitrary phase-shifter angles used in deriving the line-voltage and line-current responses for the relay.

It is a characteristic of my present invention that a differential unidirectional-current relay is caused to develop operating and restraining forces, $F_o$ and $F_r$, respectively, which are responsive to the quantities which are obtained by rectifying each of the two single phase relaying quantities. Thus, we may write $F_o =$ the magnitude of $gI\angle\theta + hE\angle S$ $$= +\sqrt{(gI\cos\theta + hE\cos S)^2 + (gI\sin\theta + hE\sin S)^2}$$

$$= +\sqrt{g^2I^2 + h^2E^2 + 2ghEI(\cos\theta\cos S + \sin\theta\sin S)}$$

$$= +\sqrt{g^2I^2 + h^2E^2 + 2ghEI\cos(\theta-S)} \quad (1)$$

and $F_r =$ the magnitude of $mI\angle(\theta+T) - nE\angle(T+U)$ $$= +\sqrt{m^2I^2 + n^2E^2 - 2mnEI[\cos(\theta+T)\cos(T+U) + \sin(\theta+T)\sin(T+U)]}$$

$$= +\sqrt{m^2I^2 + n^2E^2 - 2mnEI\cos(\theta-U)} \quad (2)$$

The balance-point of the relay is at $$g^2I^2 + h^2E^2 + 2ghEI\cos(\theta-S) =$$
$$m^2I^2 + n^2E^2 - 2mnEI\cos(\theta-U) \quad (3)$$

which is the same response as in my Patent 2,404,955.

If $n=h$, the response is a straight line rather than a circle, and if, in addition, $m=g$, the straight line passes through the origin.

For a 60° line, it is desirable that the slope of the response-line of the directional relay shall be —30°, or $$\frac{X}{R} = \tan(-30°) = -\cot 60° = -\frac{1}{3}\sqrt{3} \quad (4)$$

Putting $m=g$ and $n=h$ in the balance-point Equation 3, this equation reduces to:

$$\frac{E}{I}(\cos\theta\cos S) + \frac{E}{I}(\sin\theta\sin S) +$$
$$\frac{E}{I}(\cos\theta\cos U) + \frac{E}{I}(\sin\theta\sin U) = 0 \quad (5)$$

$R\cos S + X\sin S + R\cos U + X\sin U = 0$ $X(\sin S + \sin U) = -R(\cos S + \cos U) \quad (6)$ Rewriting Equation 6 and combining it with Equation 4, $$\frac{X}{R} = -\frac{\cos S + \cos U}{\sin S + \sin U} = -\cot\frac{1}{2}(S+U) = -\cot 60° \quad (7)$$

$$\therefore \frac{1}{2}(S+U) = 60°; \therefore S+U = 120° \quad (8)$$

In general, if $\theta_L$ is the phase-angle of the protected line, the slope of the response-line of the directional relay is $$\frac{X}{R} = \tan(\theta_L - 90°) = -\cot\theta_L \quad (9)$$

and $$S + U = 2\theta_L \quad (10)$$

It is frequently desirable, as a convenience because of the simplicity of the resulting circuits, to make $S$ and $U$ equal to each other, yielding $$S = U = \theta_L, \quad (11)$$

the phase-angle of the protected line.

It is obvious from Equation 10, however, that I am not at all limited to the special conditions stated in Equation 11.

The two diverse line-derived single-phase quantities do not need to be written as previously stated. Instead of considering the phase-shift $S$ or $U$ of the line-voltage $E$ with respect to the line-current $I\angle\theta$, the same result would be obtained by considering the phase-shift $(-S)$ or $(-U)$ of the line-current $I\angle\theta$ with respect to the line-voltage $E$. Thus, if $H_o =$ the magnitude of $HE + GI\angle(\theta-S)$ $$= +\sqrt{[HE+GI\cos(\theta-S)]^2 + G^2I^2 - G^2I^2\cos^2(\theta-S)}$$

$$= +\sqrt{H^2E^2 + G^2I^2 + 2GHEI\cos(\theta-S)} \quad (12)$$

and $H_r =$ the magnitude of $NE - MI\angle(\theta-U)$ $$= +\sqrt{N^2E^2 + M^2I^2 - 2MNEI\cos(\theta-U)} \quad (13)$$

the balance-point of the relay is at $$G^2I^2 + H^2E^2 + 2GHEI\cos(\theta-S) =$$
$$M^2I^2 + N^2E^2 - 2MNEI\cos(\theta-U) \quad (14)$$

which is the same response as in my Patent 2,404,955, as found hereinabove in Equation 3.

Fig. 1 is a simplified diagram of the general features of an illustrative form of embodiment of my invention, using a type of response such as is set forth in Equations 1, 2 and 3. A three-phase line, to be protected, is schematically indicated at A, B and C, and a polarized relay is indicated schematically, at 6, as having, by way of example, a polarized armature 7, having north and south poles N and S, serving as the movable-contact element of a relay-circuit 8. The polarized relay 6 is illustrated as having a magnetizable core 7' which is differentially energized from a plurality of pairs of operating and restraining coils $O_A$, $R_A$; $O_B$, $R_B$; $O_C$, $R_C$; and $O_G$, $R_G$. Each of the eight relay-coils is responsive to a resultant single-phase relaying quantity which is obtained by any suitable means, as from the secondary winding 11 of a three-winding transformer 12, having a line-current-energized primary winding 13, and a line-voltage-energized primary winding 14.

The current-coil 13 of the transformer 12 which energizes the operating coil $O_A$ receives the delta line-current $(I_A-I_B)$ from a bank of line-current transformers 15, while the voltage-coil 14 of the same transformer is energized so as to be responsive to the line-voltage $E_{CA}$, in series with a phase-shifter $\phi_1$, which introduces a phase-shift represented by the angle S in Equation 11.

The same line-current $(I_A-I_B)$ is supplied to the current-coil 13 of the second transformer 12, which energizes the restraint-winding $R_A$, while the voltage-coil of this second transformer is energized from the line-voltage $E_{AC}$, or $(-E_{CA})$, in series with a phase shifter $\phi_2$, which introduces a phase-shift corresponding to the angle U in Equation 2.

Similar connections are provided for the next two pairs of transformers 12, so that they will be responsive to the other two delta-phases of the line, the same phase-shifter angles being used for the respective voltage-coils. The three current-circuits, for the delta line-currents $(I_A-I_B)$, $(I_B-I_C)$, and $(I_C-I_A)$, are connected to a common star-point SP.

In Fig. 1, the first three pairs of transformers 12 are used to energize the first three pairs of operating and restraining-windings $O_A$, $R_A$; $O_B$, $R_B$ and $O_C$, $R_C$ of the polarized relay 6, so as to make it respond differentially for faults on each of the line-phases, as distinguished by the subscripts A, B and C. This sort of response does well for phase-faults, but a ground-fault would have to carry more current than the phase-fault, in order to effect the same response of the relay, if only these three phase-fault responses were obtained.

In Fig. 1, therefore, I have illustrated an additional means whereby the relay may be caused to respond, as sensitively as may be desired, to ground-faults. To this end, I provide a last pair of relay-coils $O_G$ and $R_G$, which are energized from the last two transformers 12, so as to be responsive to the zero-sequence line-current, as supplied by a bank of parallel-connected line-current transformers 16, and the zero-sequence line-voltage, as supplied by a bank of potential-transformers 17 having open-delta secondary-windings 18. The voltage-coils of the last two transformers 12 are connected in series with phase-shifters $\phi_3$ and $\phi_4$, which do not necessarily have to have the same phase-angle shift as the phase-shifters $\phi_1$ and $\phi_2$, respectively.

The phase-shifters $\phi_1$ to $\phi_4$ have been diagrammatically indicated by serially connected rectangles, and this is intended as a convenience for indicating any suitable or well-known phase-shifting means, whether series or shunt-connected. The effective series-circuit impedance of each of the phase-shifters should be larger than the magnetizing impedance of the voltage-coil 14 which it energizes, so that the voltage-coil of each of the transformers 12 will not resist any flux-change in the iron core of the transformer, as the result of changes in the instantaneous ampere-turns of the current-coil 13.

In accordance with my invention, as previously explained, and as shown in Fig. 1, the several single-phase relaying quantities, which are obtained in the secondary windings 11 of the several three-winding transformers 12, are rectified, before being applied to the respective operating and restraining relay-coils $O_A$ to $R_G$. In Fig. 1, an exemplary form of rectifier-circuit is shown, involving a mid-tap connection 20, constituting the return-circuit connection for each of the transformer-secondaries 11, and two terminal-circuit connections 21 and 22, which are connected to a common positive output-terminal 23 through separate rectifiers 24 and 25. These rectified currents, from the terminals 23 and 20 of the secondary circuits of the respective three-winding transformers 12, are applied to the respective relay-coils in such polarity that the operating-coils $O_A$, $O_B$, $O_C$ and $O_G$ tend to cause a relay-operation, and the restraining-coils $R_A$, $R_B$, $R_C$ and $R_G$ tend to prevent the relay from operating, so that the relay responds only when the sum of the four operating-forces is larger than the sum of the four restraining forces.

If desired, any suitable wave-smoothing means or ripple-suppressors may be utilized, across the secondary output-circuits 23—20, as indicated schematically by capacitors 26. These capacitors are needed more in the restraining-coil circuits than in the operating-coil circuits, but they have been shown in both. In some instances, it may be possible to omit the ripple-smoothing capacitors 26 altogether.

It will be understood that the phase-shifters $\phi_1$ to $\phi_4$ may, in the general case, be separately adjustable, for any desired phase-shift angle; and it will be further understood that the magnitudes of the responses to the different line-currents and line-voltages may also be separately or independently adjusted, as has been indicated diagrammatically by the various taps 27 which are provided on each of the primary windings 13 and 14 of the three-winding transformers 12 in Fig. 1.

The zero-sequence or ground-fault response which is provided in the apparatus shown in Fig. 1 is not obligatory, as my invention may well be used without it, and, in general, my invention is capable of differentially responding to any number of pairs of relaying quantities, whether representing delta-phases, star-phases, zero-sequence phases, or mixtures of star and delta phases.

To indicate the alternativeness of the zero-sequence response, in Fig. 1, I have shown a relay 30, having two back-contacts 31 and 32, connected in series with the two return-circuit leads 20 of the last two three-winding transformers 12. The relay 30 also has a make-contact 33, which is connected in shunt across the output-circuit of the parallel-connected line-current transformer 16, so as to short-circuit the same when the relay 30 is energized. The relay-contacts 31, 32 and 33 have wiping points so that the make-contact 33 closes before the circuit is broken at the back-contacts 31 and 32, and so that the make-contact 33 remains closed as the relay continues to move and finally opens the two back-contacts 31 and 32. The relay 30 is shown as being energized from a battery 34 through a switch-device 35 which may be actuated for the purpose of causing the relay to short-circuit the line-current transformers 16 and to open-circuit the ground-fault-responsive relay-coils $O_G$ and $R_G$.

In the operation of my invention as shown in Fig. 1, each pair of operating and restraining relay-coils such as $O_A$ and $R_A$ are energized as shown in Equations 1 and 2, so that the balance-point of the relay is as expressed in Equation 3, which is the same as Equation 5 of my Patent 2,404,955, with the inequality sign replaced by an equality sign, so as to represent the balance-point of the relay rather than the conditions under which the relay will respond. The significance of this equation, in representing the relay-characteristic of a modified-impedance relay, is well understood in the art, as explained in my aforesaid Patent 2,404,955, and also in the other patents which I have mentioned hereinabove.

In Fig. 1, I have shown a form of embodiment of my invention in which the line-current-responsive parts of the several alternating-current relaying-quantities, which are vectorially responsive to both current and voltage, has been in phase with the corresponding line-current. Any desired relative phase-shift between the current- and voltage-responses has been introduced in the voltage-responsive circuits, by way of the phase-shifters $\phi_1$ to $\phi_4$. The phase-shift angle T, which was represented in the general case expressed in Equation 2, is thus zero, in Fig. 1. I wish it to be understood, of course, that this is not obligatory, although it will probably generally be desirable, in cases where there is no current-responsive phase-shift in the response which is expressed in Equation 1.

Figure 2:
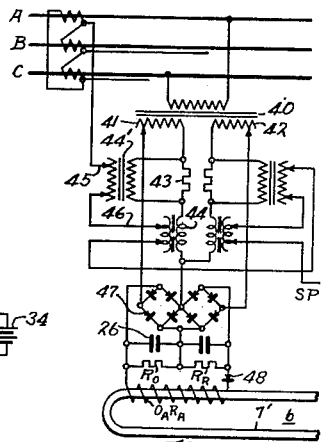
Fig. 2 is a partial diagram illustrating a modification which is the electrical equivalent of Fig. 1.

Fig. 2 is a view of only the circuits for the first pair of relay-coils $O_A$ and $R_A$ of Fig. 1, showing an alternative current- and voltage-responsive means, in accordance with Equations 12 and 13 hereinabove. In this case, the voltage-response is obtained from a potential-transformer 40 having two secondary windings 41 and 42 which are provided with taps so that the magnitude-coefficients H and N may be varied, in Equations 12 and 13. The two current-responses are obtained by line-current-energized compensators, shown as comprising, in each case, a serially connected resistance 43 and a serially-connected variable inductance 44. The resistance 43 is energized with the appropriate line-current through an auxiliary current-transformer 44' having taps 45 whereby the magnitude and the direction of the line-current excitation of the resistor 43 may be varied. The reactor 44 is illustrated as the secondary winding of a two-coil inductance-device having taps 46 for varying the magnitude and the direction of the current-responsive energization of the reactor 44. In Fig. 2, by way of illustration, a different kind of rectifying circuit is utilized, involving, in each case, a rectifier-bridge 47, which supplies the rectified exciting-current for its corresponding relay-coil, such as $O_A$, or the like.

The response of the type of relay which is shown in Fig. 2 is the same as expressed in Equation 14, which is identical with Equation 3, except that the various coefficients are written in capital letters rather than in lowercase letters. The relay of Fig. 2, therefore, operates essentially the same as in Fig. 1, and no further description is believed to be necessary.

Fig. 2 also shows two variations which may be embodied in Fig. 1, or in any of the other figures of my drawing. Instead of using separate operating- and restraining-coils, such as $O_A$ and $R_A$ in Fig. 1, which separately load the rectified operating and restraining circuits, these circuits may be separately loaded by resistors $R_O$ and $R_R$, respectively. These resistors may be connected in series, so that the positive voltage-drop in $R_O$ is added to the negative voltage-drop in $R_R$, and the sum of these voltages, or the over-all resultant voltage, may be applied to a single relacoil $O_A R_A$, as shown in Fig. 2. In other words, the restraining and operating forces may be combined electrically, as shown in Fig. 2, which is fully equivalent to combining said forces magnetically as shown in Fig. 1.

Fig. 2 also shows the possibility of adding a rectifier 48 in the output-circuit of each pair of operating and restraining loading-resistors $R_O$ and $R_R$, for each of the phases or control-circuits of the relay, the polarity of the rectifier being such as to admit the flow of only currents in the operating direction. This is desirable in polyphase modified-impedance relays which should respond only to in-looking line-impedances in the faulted phase or phases, and should not respond to an out-looking impedance in any other phase. This feature might occasionally be desirable, also, in some polyphase directional relays for applications in which the fault-current has a magnitude comparable to the load-current.

The apparatus shown in Figs. 1 and 2 is preferably general, in its application to all kinds and adjustments of modified-impedance relays, having any desired kind of response-characteristics. When the requirements are narrowed, so that the relay does not need to be adjustable to as many different kinds and limits of responses, the circuits can be simpler.

Figure 3:
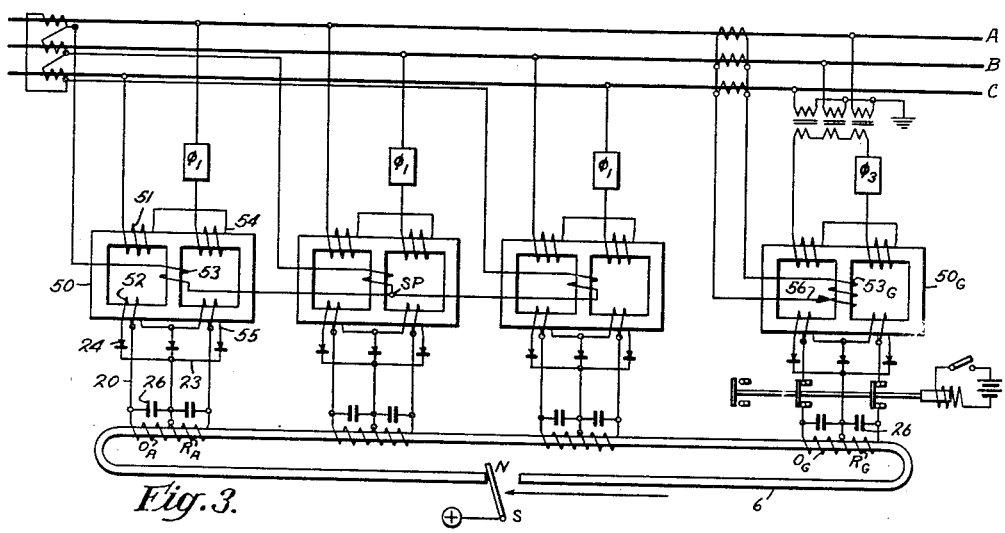
Figs. 3 and 4 are views similar to Fig. 1 showing two different forms of simplified circuits applicable to a form of embodiment of my invention in which the impedance-characteristics are modified to produce a directional-relay response.

An important field of application for my invention is shown in Fig. 3, wherein the invention is applied to a relay which produces a directional response; that is, where the radius of the response-circle is infinity, or very large, resulting in a straight-line response, which passes through, or near, the origin of the coordinates which represent the line-resistance R and the line-reactance X in the familiar impedance-circle response-diagram (not shown). As previously indicated, the relay-response is a straight line, rather than a circle, when the magnitude-ratios $h$ and $n$ of the voltage-responses are equal; and this straight line passes through the origin when the magnitude-ratios $g$ and $m$ of the current-responses are equal. If, in addition to these limitations, we stipulate an equal phase-difference between the current-responses and the voltage-responses, for the two single-phase relaying quantities which are to be differentially compared, the relay-circuits become fairly simple, and the phase-displacement, which is introduced in either the voltage-circuit or the current-circuit, is equal to the impedance-angle of the line which is being protected, or, more accurately, the line power-factor angle at which the directional element is to have its maximum response.

In Fig. 3, I utilize a separate five-winding transformer 50 for each of the single-phase responses of the relay, that is, for each pair of operating and restraining coils of the relay, such as the coils $O_A$ and $R_A$. Each of these five-winding transformers comprises a three-legged core. The first leg carries a voltage-responsive primary winding 51 and an output or secondary winding 52. The middle core-leg carries a current-responsive primary winding 53. The third core-leg carries a reversely connected voltage-responsive primary winding 54, and another output or secondary winding 55. It is obvious that one of the secondary windings, such as 52, is responsive to the vectorial sum of the current-response and the voltage-response, while the other secondary winding, 55, is responsive to the difference between the current-response and the voltage-response. It is obvious that the same effect would be obtained if the coils 51 and 54 were current-coils and the coil 53 a voltage-coil. Otherwise, the connections are the same as have been described and claimed in connection with Fig. 1, and the same rectifier-connections 24 are used.

Since the relay, in Fig. 3, is a directionally responsive relay, the magnitude-responses do not need to be adjusted, the only significant thing being the relative phase-angle between the currents and voltages which are vectorially added to make up the alternating-current relaying-quantities which appear in the secondaries 52 and 55, and this phase-angle is controllable by means of the phase-shifters $\phi_1$, a single phase-shifter controlling both the angles S and U by reason of the fact that the voltage-coils 51 and 54 are connected in series with each other, with one of the coils reversed so as to provide for the minus sign before the voltage-coefficient $n$ in the first line of Equation 2.

In cases in which a zero-sequence directional response is to be obtained, as by means of the relay-coils $O_G$ and $R_G$, in addition to a phase-current response, as in the coils $O_A$ and $R_A$, it may be desirable to be able to control the relative weight of the zero-sequence directional response, as compared to the phase-fault directional response, and to this end, the current-coil $53_G$ of the zero-sequence transformer $50_G$ may be provided with adjustable taps, as shown at 56 in Fig. 3.

In other respects, the circuits shown in Fig. 3 are similar to those shown in Fig. 1, and the response is as shown in Equations 1 to 14, with the coefficients $n=h$, and $m=g$, with the angle $T=0$, and with the angles S and U equal to each other. The pairs of rectified outputs are applied to the polarized relay 6 without interference from each other. On any type of phase-fault, all of the pairs of phase-fault balanced coils, such as $O_A$ and $R_A$, will have net ampere-turns in the same direction, all pairs having a net effect tending to cause a relay-response if the currents and voltages have a phase-angle within the range of the relay-response. The total effect is the same as if a plurality of single-phase watt-type directional elements were mechanically connected together with their movable elements all on the same shaft, only I accomplish this result in a single relay.

One of the problems encountered in the design of any type of directional element is that of satisfactory operation on very high currents and extremely low voltages. This condition is encountered, however, only on three-phase faults. It should be noted that, with the arrangement shown in Fig. 3, all three phases are contributing energy to a single element, on a three-phase fault, and this should alleviate the high-current, low-voltage difficulty.

It is to be understood that my invention is broadly concerned with the problem of deriving two single-phase relaying quantities, one of which is the vectorial sum of a current-responsive quantity and a voltage-responsive quantity, while the other is the vectorial difference between the same two quantities. There are many means and circuit-connections for obtaining these results, and I contemplate that my invention broadly covers them all.

Figure 4:
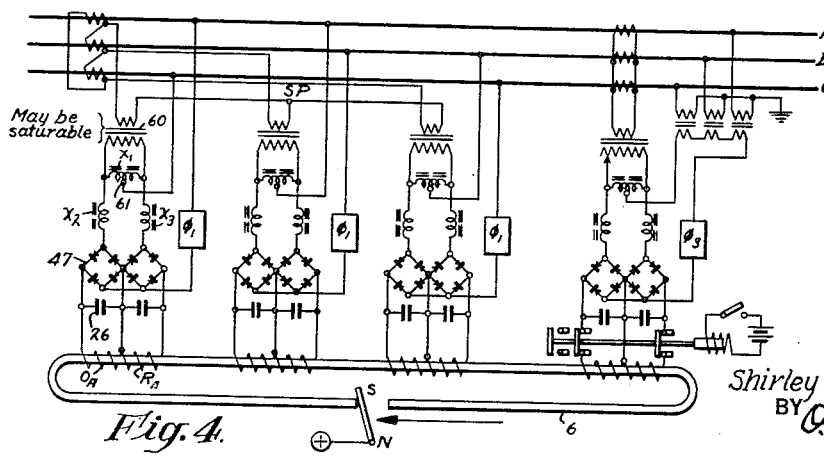

Fig. 4 shows an alternative system of apparatus and connections, which is in general preferred to that which is shown in Fig. 3, for embodiments of my invention in which the object is to obtain a single-phase directional response, or to obtain a composite response which is the sum of as many separate single-phase directional responses as may be desired, such as one directional response for each phase of a three-phase line, or one for each of the three phases, and another one for ground-fault or zero-sequence directional responses.

Fig. 4 is preferred, in many cases, because it offers possibilities for introducing saturation into the current-responsive circuits, so as to prevent the application of high current-magnitudes to the rectifiers and to the relay-coils. In Fig. 3, for example, saturation of the core of the five-winding transformer 50 would have caused trouble because the voltage-coils 51 and 54 would be on the saturated magnetic circuits.

In Fig. 4, therefore, I combine the current-responses and the voltage-responses non-magnetically, by using a compensator type of arrangement for supplying an alternating voltage which is responsive to the line-current. This sort of arrangement thus makes it possible to introduce magnetic saturation in current-transformers which are used to supply each of the individual compensator-currents, as indicated at 60 in Fig. 4. Both theory and experiments show that it is possible to introduce a very considerable amount of saturation in a current-transformer, without causing a phase-shift or a wave-form distortion in the secondary current, provided that the load on the transformer is highly reactive. In Fig. 4, therefore, I have indicated that the several individual current-transformers 60 may be saturable, and I have loaded the secondary circuits of these transformers with a reactor $X_1$. The voltage-drop across each reactor $X_1$ is split, by means of a mid-tap 61, and is fed into the voltage-circuit through two serially connected reactors $X_2$ and $X_3$, so that quantities proportional to $(\dot{E}+\dot{I})$ and $(\dot{E}-\dot{I})$ can be rectified, as by means of rectifier-bridges 47, and the rectified unidirectional quantities may be fed to the proper coils of the polarized relay 6, such as the coils $O_A$ and $R_A$. Any desired phase-relation between the vectors $\dot{E}$ and $\dot{I}$ can be obtained, as by means of the phase-shifters $\phi_1$ and $\phi_3$, as previously explained.

Otherwise, the connections of Fig. 4 are, or may be, similar to those already described in connection with Figs. 1, 2 and 3, and the operation is essentially the same as that which has been described in connection with Fig. 3.

It will be understood, of course, that saturation, or other current-limiting means, may be introduced in the other figures, as well as in Fig. 4, with the understanding that the current-limiting effect should be combined to the current-response rather than the voltage-response. In general, however, current-limiting effects are not desired in a modified-impedance relay having a circle-response with a finite radius, because such saturation-effects are not constant, from one transformer to another, and thus would have a more or less unpredictable effect upon the "reach" of an impedance-type relay. However, in the case of a directional relay, the relay-reach is unimportant, only the power-factor current-angle being important, and saturation-effects are easily tolerated, and are desirable because of their benefit in reducing the burdens on the rectifiers and the relay-coils.

While I have described my invention in four specific illustrative forms of embodiment, and while I have discussed several different kinds of application for my invention, I wish it to be understood that I am not limited to the particular forms or applications which have been chosen for illustration, as many changes of omission, addition, and substitution can be made, by those skilled in the art, without departing from the broader aspects of the invention. I desire, therefore, that the appended claims shall be accorded the broadest construction consistent with their language.

I claim as my invention:

1. A relaying assembly adapted for use on a polyphase line and comprising means for producing a plurality of diverse pairs of diverse line-derived single-phase relaying quantities, at least one of said diverse single-phase relaying quantities of each pair being the vectorial sum of a line-voltage response and a line-current response, means for individually rectifying each of said single-phase relaying quantities, thus producing, from each pair of single-phase relaying quantities, a direct-current relay-operating electrical input-quantity and a direct-current relay-restraining electrical input-quantity, and a multi-circuit-responsive single-element relay comprising a stationary member, a movable member cooperating with said stationary member, and a relay-contact-means operated by said movable member, said stationary member including means for providing a single composite operating-flux which is responsive to the sum of all of the relay-operating input-quantities, said stationary member also including means for providing a single composite restraining-flux which is responsive to the sum of all of the relay-restraining input-quantities, and said movable member having magnetizable means whereby it is operated upon in an operating direction by said operating-flux and in a restraining direction by said restraining flux.

2. A relaying assembly adapted for use on a polyphase line and comprising means for producing a plurality of diverse pairs of diverse line-derived single-phase relaying quantities, each of said diverse single-phase relaying quantities of each pair being the vectorial sum of a line-voltage response and a line-current response, means for individually rectifying each of said single-phase relaying quantities, thus producing, from each pair of single-phase relaying quantities, a direct-current relay-operating electrical input-quantity and a direct-current relay-restraining electrical input-quantity, and a multi-circuit-responsive single-element relay comprising a stationary member, a movable member cooperating with said stationary member, and a relay-contact-means operated by said movable member, said stationary member including means for providing a single composite operating-flux which is responsive to the sum of all of the relay-operating input-quantities, said stationary member also including means for providing a single composite restraining-flux which is responsive to the sum of all of the relay-restraining input-quantities, and said movable member having magnetizable means whereby it is operated upon in an operating direction by said operating-flux and in a restraining direction by said restraining flux.

3. A directionally responsive relaying assembly adapted for use on an alternating-current line and comprising means for producing a pair of diverse line-derived single-phase relaying quantities, one of said diverse single-phase relaying quantities being the vectorial sum, and the other being the vectorial difference, of a line-voltage response and a line-current response, the magnitudes of the two line-voltage-response parts of said pair of single-phase relaying quantities being approximately the same for said pair, and relay-means for responding to said single-phase relaying quantities.

4. The invention as defined in claim 3, characterized by the phase-angle of the two line-voltage-response parts of said pair of single-phase relaying quantities being approximately the same for said pair, and the phase-angles of the two line-current-response parts of said pair of single-phase relaying quantities being approximately the same for said pair.

5. The invention as defined in claim 3, characterized by the magnitudes of the two line-current-response parts of said pair of single-phase relaying quantities being also approximately the same for said pair.

6. The invention as defined in claim 3, characterized by the magnitudes of the two line-current-response parts of said pair of single-phase relaying quantities being also approximately the same for said pair, and further characterized by the phase-angle of the two line-voltage-response parts of said pair of single-phase relaying quantities being approximately the same for said pair, and the phase-angles of the two line-current-response parts of said pair of single-phase relaying quantities being approximately the same for said pair.

7. The invention as defined in claim 3, characterized by said relay-means being differentially responsive to the single-phase relaying quantities of said pair.

8. The invention as defined in claim 3, characterized by said relay-means being differentially responsive to the single-phase relaying quantities of said pair, and further characterized by the phase-angle of the two line-voltage-response parts of said pair of single-phase relaying quantities being approximately the same for said pair, and the phase-angles of the two line-current-response parts of said pair of single-phase relaying quantities being approximately the same for said pair.

9. The invention as defined in claim 3, characterized by said relay-means being differentially responsive to the single-phase relaying quantities of said pair, and further characterized by the magnitudes of the two line-current-response parts of said pair of single-phase relaying quantities being also approximately the same for said pair.

10. The invention as defined in claim 3, characterized by said relay-means being differentially responsive to the single-phase relaying quantities of said pair, and further characterized by the magnitudes of the two line-current-response parts of said pair of single-phase relaying quantities being also approximately the same for said pair, and still further characterized by the phase-angle of the two line-voltage-response parts of said pair of single-phase relaying quantities being approximately the same for said pair, and the phase-angles of the two line-current-response parts of said pair of single-phase relaying quantities being approximately the same for said pair.

11. The invention as defined in claim 3, characterized by said relay-means comprising means for individually rectifying each of said single-phase relaying quantities, and relay-means for responding to the difference between the rectified quantities so obtained.

12. The invention as defined in claim 3, characterized by said relay-means comprising means for individually rectifying each of said single-phase relaying quantities, and relay-means for responding to the difference between the rectified quantities so obtained, and further characterized by the phase-angle of the two line-voltage-response parts of said pair of single-phase relaying quantities being approximately the same for said pair, and the phase-angles of the two line-current-response parts of said pair of single-phase relaying quantities being approximately the same for said pair.

13. The invention as defined in claim 3, characterized by said relay-means comprising means for individually rectifying each of said single-phase relaying quantities, and relay-means for responding to the difference between the rectified quantities so obtained, and further characterized by the magnitudes of the two line-current-response parts of said pair of single-phase relaying quantities being also approximately the same for said pair.

14. The invention as defined in claim 3, characterized by said relay-means comprising means for individually rectifying each of said single-phase relaying quantities, and relay-means for responding to the difference between the rectified quantities so obtained, and further characterized by the magnitudes of the two line-current-response parts of said pair of single-phase relaying quantities being also approximately the same for said pair, and still further characterized by the phase-angle of the two line-voltage-response parts of said pair of single-phase relaying quantities being approximately the same for said pair, and the phase-angles of the two line-current-response parts of said pair of single-phase relaying quantities being approximately the same for said pair.

15. A directional relaying assembly adapted for use on a polyphase line and comprising means for producing a pair of diverse line-derived single-phase relaying quantities, one of said diverse single-phase relaying quantities of each pair being the vectorial sum, and the other being the vectorial difference, of a line-voltage response and a line-current response, the magnitudes of the two line-voltage-response parts of each pair of single-phase relaying quantities being approximately the same for that pair, means for individually rectifying each of said single-phase relaying quantities, thus producing, from each pair of single-phase relaying quantities, a direct-current relay-operating electrical input-quantity and a direct-current relay-restraining electrical input-quantity, and a multi-circuit-responsive single-element relay comprising a stationary member, a movable member cooperating with said stationary member, and a relay-contact-means operated by said movable member, said stationary member including means for providing a single composite operating-flux which is responsive to the sum of all of the relay-operating input-quantities, said stationary member also including means for providing a single composite restraining-flux which is responsive to the sum of all of the relay-restraining input-quantities, and said movable member having magnetizable means whereby it is operated upon in an operating direction by said operating-flux and in a restraining direction by said restraining flux.

16. The invention as defined in claim 15, characterized by the phase-angles of the two line-voltage-response parts of each pair of single-phase relaying quantities being approximately the same for that pair, and the phase-angles of the two line-current-response parts of each pair of single-phase relaying quantities being approximately the same for that pair.

17. The invention as defined in claim 15, characterized by the magnitudes of the two line-current-response parts of each pair of single-phase relaying quantities being also approximately the same for that pair.

18. The invention as defined in claim 15, characterized by the magnitudes of the two line-current-response parts of each pair of single-phase relaying quantities being also approximately the same for that pair, and further characterized by the phase-angles of the two line-voltage-response parts of each pair of single-phase relaying quantities being approximately the same for that pair, and the phase-angles of the two line-current-response parts of each pair of single-phase relaying quantities being approximately the same for that pair.

19. A multi-circuit-responsive single-element relay comprising a stationary member, a movable member cooperating with said stationary member, a relay-contact-means operated by said movable member, and a plurality of pairs of electric-circuit-means for providing a plurality of diverse pairs of diverse differentially related electrical-quantities including a direct-current relay-operating electrical quantity and a direct-current relay-restraining electrical quantity, said stationary member including means for providing a single composite operating-flux which is responsive to the sum of all of the relay-operating input-quantities, said stationary member also including means for providing a single composite restraining-flux which is responsive to the sum of all of the relay-restraining input-quantities, and said movable member having magnetizable means whereby it is operated upon in an operating direction by said operating-flux and in a restraining direction by said restraining-flux.

SHIRLEY L. GOLDSBOROUGH.

REFERENCES CITED

The following references are of record in the file of this patent:

UNITED STATES PATENTS

| Number | Name | Date |
|---|---|---|
| 818,424 | Eastman | Apr. 24, 1906 |
| 2,300,886 | Goldsborough | Nov. 3, 1942 |
| 2,301,162 | Hoard | Nov. 3, 1942 |
| 2,381,527 | Traver | Aug. 7, 1945 |
| 2,404,955 | Goldsborough | July 30, 1946 |

FOREIGN PATENTS

| Number | Country | Date |
|---|---|---|
| 589,153 | Germany | Dec. 4, 1933 |